United States Patent
Gale et al.

(10) Patent No.: US 10,225,741 B2
(45) Date of Patent: *Mar. 5, 2019

(54) SECURITY ENABLED PREDICTIVE MOBILE DATA CACHING

(71) Applicant: International Business Machines Corporation, Armonk, NY (US)

(72) Inventors: Martin J. Gale, Eastleigh (GB); Erik H. Katzen, Argyle, TX (US)

(73) Assignee: International Business Machines Corporation, Armonk, NY (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/375,354

(22) Filed: Dec. 12, 2016

(65) Prior Publication Data

US 2018/0167817 A1    Jun. 14, 2018

(51) Int. Cl.
| | |
|---|---|
| H04L 29/08 | (2006.01) |
| H04W 12/10 | (2009.01) |
| H04L 29/06 | (2006.01) |
| G06F 12/0862 | (2016.01) |
| G06F 21/56 | (2013.01) |
| H04L 12/24 | (2006.01) |

(52) U.S. Cl.
CPC ........ *H04W 12/10* (2013.01); *G06F 12/0862* (2013.01); *G06F 21/567* (2013.01); *H04L 41/147* (2013.01); *H04L 63/1408* (2013.01); *H04L 67/12* (2013.01); *H04L 67/18* (2013.01); *H04L 67/2842* (2013.01); *H04L 67/2847* (2013.01); *G06F 2212/602* (2013.01)

(58) Field of Classification Search
CPC .......... G06F 12/0862; G06F 2212/602; H04W 48/04; H04W 12/08
USPC .......................................................... 726/22
See application file for complete search history.

(56) References Cited

U.S. PATENT DOCUMENTS

| | | |
|---|---|---|
| 7,024,428 B1 | 4/2006 | Huang et al. |
| 7,979,516 B2 | 7/2011 | Dacosta |
| 9,173,104 B2 | 10/2015 | Raleigh |

(Continued)

FOREIGN PATENT DOCUMENTS

| | | |
|---|---|---|
| CA | 2740479 A1 | 5/2011 |
| WO | 2013050216 A1 | 4/2013 |

OTHER PUBLICATIONS

Gale et al., "Security Enabled Predictive Mobile Data Caching", U.S. Appl. No. 15/695,039, filed Sep. 5, 2017, 28 pages.

(Continued)

*Primary Examiner* — Matthew T Henning
(74) *Attorney, Agent, or Firm* — Monchai Chuaychoo

(57) ABSTRACT

An approach to preemptive mobile data caching is provided, the approach involves retrieving user data associated with a user of a mobile computing device, retrieving external data associated with network service availability, predicting a location the user is travelling to based on the user data retrieved, determining a data security risk profile associated with the location predicted, based on the user data and the external data retrieved, determining data to be prefetched in advance of a user request for the data, wherein the data is determined based on an analysis of the user data retrieved, the location predicted and the data security risk profile and prefetching the data determined in advance of the user request for the data.

14 Claims, 4 Drawing Sheets

(56) References Cited

U.S. PATENT DOCUMENTS

| | | |
|---|---|---|
| 2007/0180125 A1 | 8/2007 | Knowles et al. |
| 2011/0141276 A1 | 6/2011 | Borghei |
| 2012/0220308 A1 | 8/2012 | Ledlie |
| 2013/0122856 A1 | 5/2013 | Kalmbach et al. |
| 2013/0260720 A1 | 10/2013 | Miyaki |
| 2013/0260789 A1* | 10/2013 | Woo ............... H04W 4/027 455/456.1 |
| 2014/0032691 A1 | 1/2014 | Barton |
| 2014/0242954 A1 | 8/2014 | Chang et al. |
| 2014/0289875 A1 | 9/2014 | Knafel |
| 2015/0324616 A1 | 11/2015 | Alarabi |
| 2016/0044127 A1 | 2/2016 | Filner et al. |
| 2016/0226911 A1 | 8/2016 | Boss |
| 2016/0295359 A1 | 10/2016 | Lamarca |
| 2016/0378665 A1* | 12/2016 | Li ..................... G06F 3/06 711/129 |
| 2018/0108003 A1* | 4/2018 | Todasco ......... G06Q 20/3224 |

OTHER PUBLICATIONS

IBM Appendix P, list of patents or patent applications treated as related, 2017, 2 pages.

Disclosed Anonymously, "Method and System to invoke mobile application data communication actions based on analytics of network enviornment, financial impact and security posture", An IP.com Prior Art Database Technical Disclosure, IP.com No. IPCOM000231066D, IP.com Electronic Publication Date: Sept. 25, 2013, 4 pages.

Disclosed Anonymously, "Method of Secure Operation of Applications on Mobile Devices Based on Environmental Sensors", An IP.com Prior Art Database Technical Disclosure, IP.com No. IPCOM0002220872D, IP.com Electronic Publication Date: Aug. 10, 2012, 6 pages.

Disclosed Anonymously, "Predictive Downloading to Optimize Data Usage in Mobile Environments", An IP.com Prior Art Database Technical Disclosure, IP.com No. IPCOM000245126D, IP.com Electronic Publication Date: Feb. 10, 2016, 3 pages.

* cited by examiner

SECURITY ENABLED PREDICTIVE MOBILE DATA CACHING

BACKGROUND

The present invention relates generally to the field of mobile computing technology, and more particularly to predictive data prefetching.

With the rise of mobile computing technology, individuals are now able to handle business and work-related affairs even while traveling or commuting. Standard mobile computing devices, such as smartphones, tablets and the like, are enabled with wireless networking technology to allow users to remotely connect to a communications network such as, but not limited to, the Internet. Examples of wireless networks for connecting a mobile device to a communications network include wireless cellular service, a Wi-Fi connection and the like.

Wireless network service often depends on the network service provider and the connection quality can vary depending on the location of a mobile device user. Predictive data prefetching is a process that anticipates when a mobile device user will attempt to access data via a wireless network when the network connection may be poor or non-existent. Wireless network service may not be available in certain geographical regions or otherwise unavailable in certain areas due to obstructions such as buildings, bridges, tunnels, etc. Data can therefore be downloaded from a communications network ahead of time, i.e., prefetched, to prevent disruptions to user access of data they will need during periods where wireless network service is limited or unavailable, e.g., network dead spots.

SUMMARY

According to one embodiment of the present invention, a method for preemptive mobile data caching is provided, the method comprises retrieving, by a data cache selector program, personal user data associated with a user of a mobile computing device; retrieving, by the data cache selector program, external data associated with network service availability; predicting, by the data cache selector program, a location the user is travelling to based on the personal user data retrieved; determining, by the data cache selector program, a data security risk profile associated with the location predicted, based on the personal user data and the external data retrieved; determining, by the data cache selector program, data to be prefetched in advance of a user request for the data, wherein the data is determined based on an analysis of the personal user data retrieved, the location predicted and the data security risk profile; and prefetching, by the data cache selector program, the data determined in advance of the user request for the data. A corresponding computer program product and computer system are also disclosed herein.

DETAILED DESCRIPTION

Mobile devices are widely pervasive for handling business affairs on the go, but issues arise when network connectivity is not guaranteed. Mobile data prefetching is therefore a useful feature for preventing interruptions to data access during times of limited network connectivity, such as time spent in network dead spots or areas of heavy network traffic. However, embodiments of the present invention recognize that mobile data prefetching can compromise the security of sensitive data that is accessed, e.g., confidential personal information or work-related information. Prefetched data sent to a user's mobile device may be vulnerable to security risks that the user is otherwise unaware of. For example, a user may be entering a geographical region with a statistically high rate of data theft over an unsecured network (such as at an airport or coffee shop, etc.), increasing the possibility that sensitive prefetched data could fall into the wrong hands and be exposed to unauthorized access. Embodiments of the present invention therefore provide a solution where potential security risks, along with an analysis of user travel patterns and routines, are factored into the process of mobile data prefetching to help prevent exposure of confidential prefetched data.

It should be noted that in certain embodiments, prefetching can be viewed as a data transmit operation from a server to the mobile device, and in other embodiments, prefetching can be viewed as a data receive operation by the mobile device from the server.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
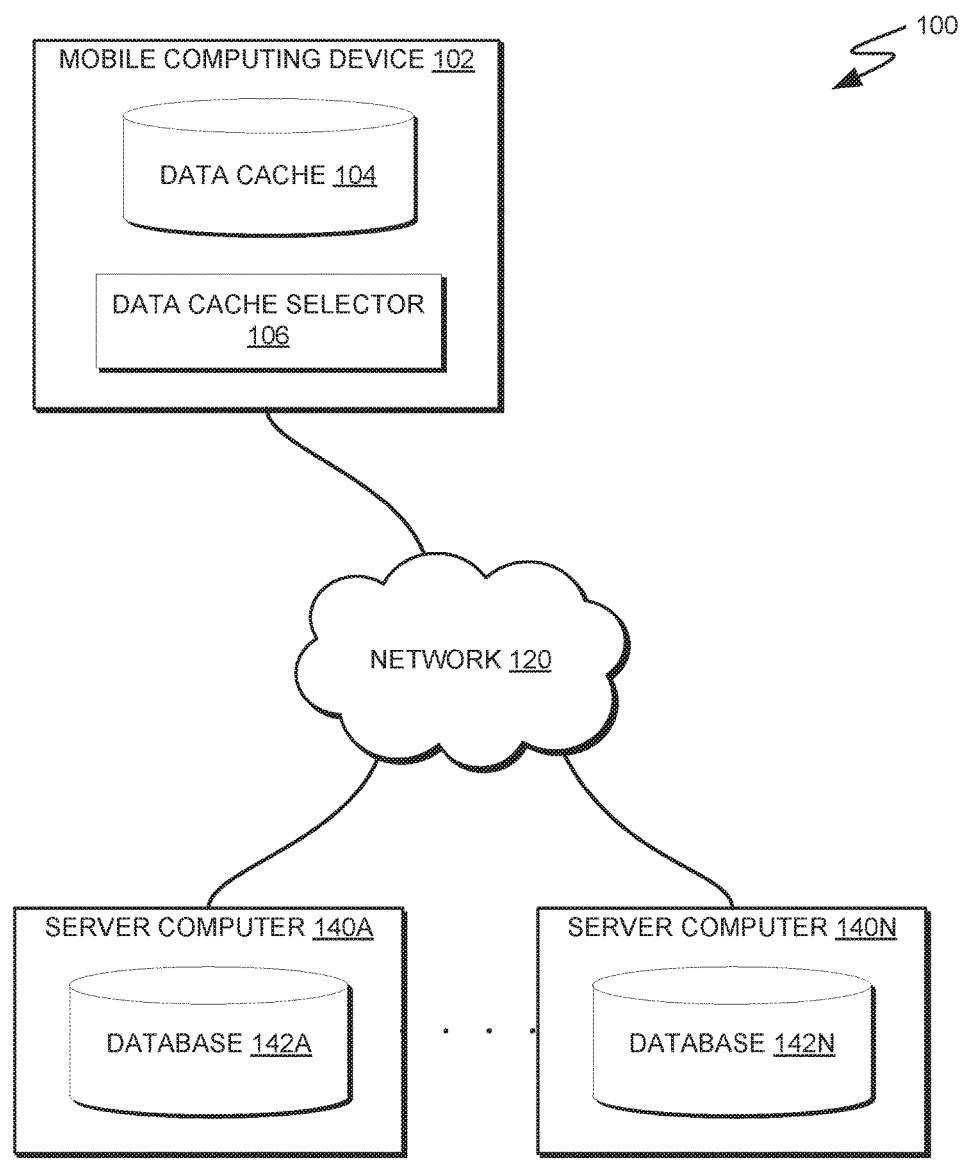
FIG. 1 is a functional block diagram illustrating a distributed data processing environment, in accordance with an embodiment of the present invention.

The present invention will now be described in detail with reference to the figures. FIG. 1 is a functional block diagram illustrating a distributed data processing environment 100, in accordance with one embodiment of the present invention. Distributed data processing environment 100 comprises mobile computing device 102 and server computers 140A-N, all interconnected over network 120.

Mobile computing device 102 represents a network capable mobile computing device that may receive and transmit confidential data over a wireless network. Mobile computing device 102 can be a laptop computer, tablet computer, netbook computer, personal computer (PC), a personal digital assistant (PDA), a smart phone, or any programmable electronic device capable of communicating with server computers 140A-N via network 120, in accordance with an embodiment of the present invention. Mobile computing device 102 includes data cache 104 and data cache selector 106 for using predictive analytics to select data for prefetching, based on anticipated user needs in areas of limited wireless network service and potential data security risks. Prefetched data can be stored in data cache 104, e.g., a form of memory for rapid data access, or another form of storage. Mobile computing device 102 may include internal and external hardware components, as depicted and described in further detail with respect to FIG. 4.

Server computers 140A-N represent network servers that manage data that is transmitted to and received from mobile computing device 102. In various embodiments, data transmitted from a server computer 140A-N may include confidential information. In various embodiments of the present invention, server computers 140A-N can each be, respectively, a laptop computer, tablet computer, netbook computer, personal computer (PC), a desktop computer, a personal digital assistant (PDA), a smart phone, or any programmable electronic device capable of communicating with mobile computing device 102 via network 120, in accordance with an embodiment of the present invention. Server computers 140A-N can be, but are not limited to, web servers, email servers and the like, which are accessed by mobile computing device 102. Server computers 140A-N include databases 142A-N for storing data that mobile computing device 102 requests for retrieval. Server computers 140A-N are generally representative of any number of server computers which may be accessed for data retrieval.

Network 120 can be, for example, a local area network (LAN), a wide area network (WAN) such as the Internet, or a combination of the two, and can include wired, wireless, or fiber optic connections. In general, network 120 can be any combination of connections and protocols that will support communications between mobile computing device 102 and server computers 140A-N, in accordance with an embodiment of the present invention.

Figure 2:
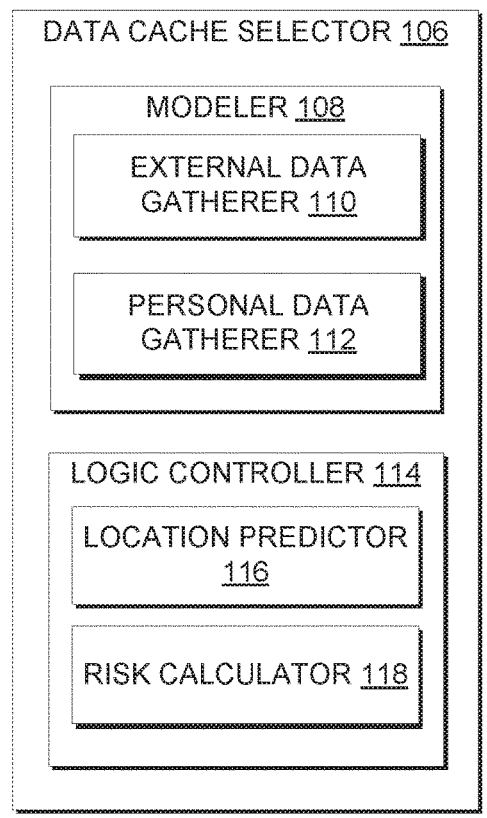
FIG. 2 is a functional block diagram depicting components of a data cache selector program, in accordance with an embodiment of the present invention.

FIG. 2 is a functional block diagram depicting components of data cache selector 106, in accordance with an embodiment of the present invention. Data cache selector 106 comprises modeler 108 and logic controller 114. Modeler 108 provides input data to logic controller 114, and modeler 108 further comprises external data gatherer 110 and personal data gatherer 112. External data gatherer 110 retrieves data from other devices (i.e., devices other than mobile computing device 102) for determining where wireless network disruptions, e.g., network dead spots, may be encountered, and for anticipating potential data security risks that may be present. Personal data gatherer 112 retrieves personal user data associated with mobile computing device 102 for predicting locations that the user of mobile computing device 102 will travel to and for determining user behavior, e.g., travel routines, and data needs.

Logic controller 114 is a component for intelligently determining what data to prefetch, based in part on user behavior, in advance of a predicted wireless network outage or limited wireless network service when the user will request the data. Logic controller 114 further comprises location predictor 116 and risk calculator 118. Location predictor 116 uses data retrieved by modeler 108 to intelligently predict locations that the user of mobile computing device 102 will travel to. Risk calculator 118 uses data retrieved by modeler 108 to intelligently predict the probability that a disruption to wireless network service will be encountered for locations that the user is predicted to travel to. Risk calculator 118 also determines data security risk profiles associated with the locations that the user is predicted to travel to.

Figure 3:
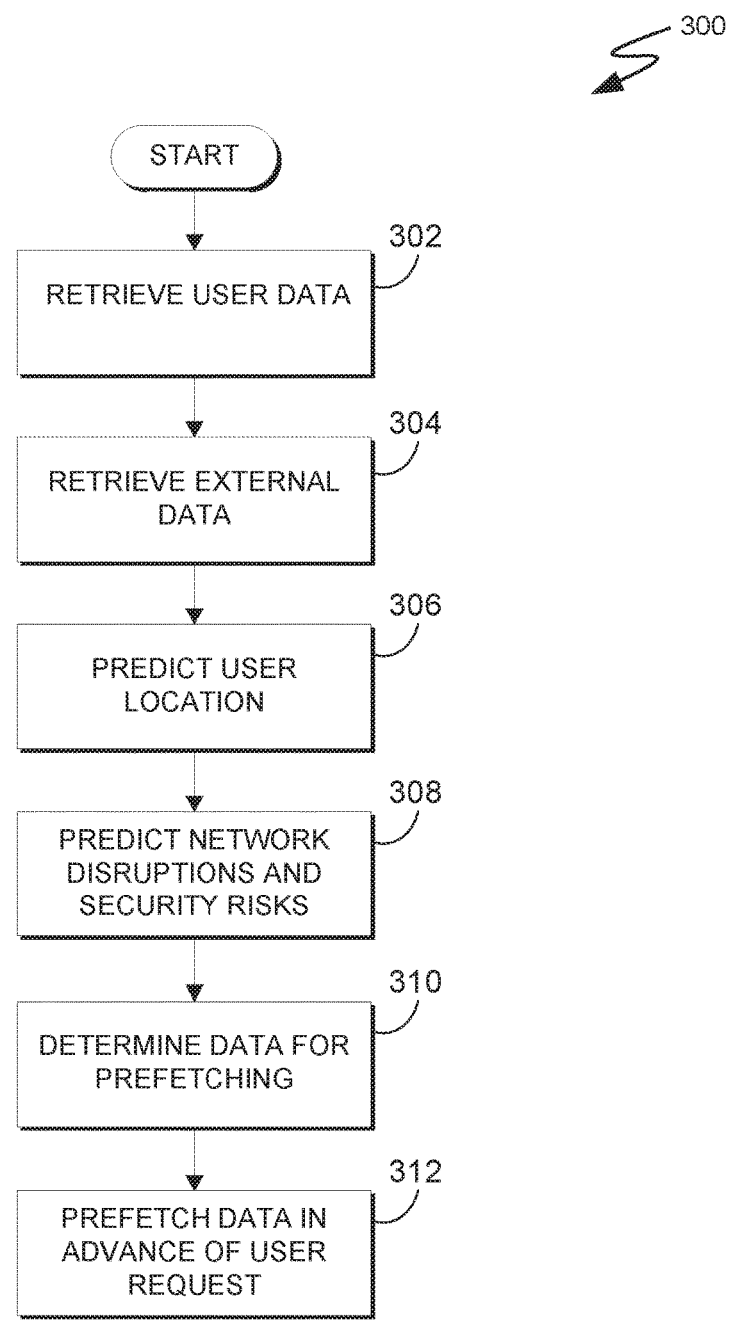
FIG. 3 is a flowchart depicting operational steps of a data cache selector program, in accordance with an embodiment of the present invention.

FIG. 3 is a flowchart 300 depicting operational steps of data cache selector 106, in accordance with an embodiment of the present invention. The illustrative example of FIG. 3 is provided to facilitate discussion of aspects of the present invention, and it should be appreciated that FIG. 3 provides only an illustration of an embodiment of the present invention and does not imply any limitations with regard to the variations or configurations in which different embodiments may be implemented.

Personal data gatherer 112 retrieves personal user data associated with a user of mobile computing device 102 (step 302). Personal user data is retrieved for at least the purpose of predicting one or more locations that the user is traveling to on a given day and to determine data that the user will likely request to have at those locations. The personal user data can be retrieved, without limitation, from any combination of the following sources: one or more program applications associated with mobile computing device 102, one or more files associated with mobile computing device 102 and data retrieved via a communication network, e.g., the Internet. The personal user data can comprise, but is not limited to, calendar information, scheduled events, reminders, notes, voice recognition data (e.g., voice memos and voicemails), historical location data (e.g., GPS data) associated with mobile computing device 102, email correspondences, social media data, data associated with network outages that the user has previously encountered, etc. In some embodiments, the user of mobile computing device 102 can configure settings associated with data cache selector 106 to restrict certain kinds of personal data from being retrieved in this way.

External data gatherer 110 retrieves data from other devices, i.e., devices other than mobile computing device 102, for determining wireless network service availability and for determining one or more data security risks a user may encounter (step 304). External data gatherer 110 can communicate with other devices by a variety of means, e.g., Bluetooth, Wi-Fi, a cellular service network, etc. Some examples of other devices that external data gatherer 110 can communicate with include, but are not limited to, one or more other mobile devices, one or more web servers (e.g., any of server computers 140A-N) and one or more Internet of Things (IoT) enabled objects or devices (e.g., objects and devices equipped with one or more sensors) which communicate data via a communications network. Any of databases 142A-N, respectively associated with server computers 140A-N, may comprise the external data retrieved in this manner.

External data gatherer 110 can retrieve and analyze social media data (e.g., blog posts, status updates, user comments, etc.) pertaining to network outages or instances of limited network service. Further, information associated with scheduled maintenance or unexpected accidents that would affect wireless network service can also be retrieved for predicting where wireless network access will be disrupted. Any information provided by wireless network service providers associated with wireless network coverage, such as wireless network service maps displaying network availability by geographic region, can also be considered.

Location predictor 116 predicts a location that the user of mobile computing device 102 is travelling to (step 306). Location predictor 116 receives data from modeler 108, such as the personal user data, which it uses in conjunction with current GPS location data associated with mobile computing device 102 to predict a geographical location that the user is headed towards. Based on an analysis and correlation of the personal user data, location predictor 116 can determine travel patterns or routines that a user takes on certain days. For example, based on stored historical location data, location predictor 116 determines that the user commutes along a particular route to work every Monday through Friday, e.g., the user takes a certain train every weekday. Location predictor 116 can use current GPS location data of the user to confirm they are on the particular route on a weekday and thus predict that they are headed to their work location.

Location predictor 116 can further analyze other personal user data, for example, reminders for scheduled meetings and email correspondences, to predict where the user will be travelling at certain times and dates. In conjunction with GPS location data, the location prediction is updated throughout the day as the user moves about with mobile computing device 102.

Risk calculator 118 predicts wireless network service disruptions and data security risks associated with locations predicted by location predictor 116 (step 308). Risk calculator 118 receives data from modeler 108 to determine the likelihood of the user of mobile computing device 102 having limited or no access to an associated wireless network service in a predicted location, and any potential data security risks associated with the predicted location. Risk calculator 118 can use data from modeler 108 to determine locations where the user of mobile computing device 102 has previously encountered wireless network service disruptions such as, but not limited to, network dead spots and areas of heavy network traffic, resulting in limited network connectivity. In some embodiments, a user travel routine is determined and analyzed to determine where the user routinely encounters network service disruptions.

Risk calculator 118 determines a data security risk profile associated with a predicted location that the user of mobile computing device 102 is heading towards (step 308). For example, based on an analysis of external data received from modeler 108, risk calculator 118 determines that a user is likely to enter a downtown area of a major city which is determined to be a high risk zone. Based on information such as crime rates, police reports, reports of lost or stolen devices, reports of cyber security breaches or device hackings (all of which are further examples of external data retrieved by external data gatherer 110) and the like, risk calculator 118 determines that the downtown area is a higher risk zone where confidential user data is more likely to be exposed to unauthorized access.

The determination of a data security risk profile for a certain location can be based on default or predetermined settings. For example, in one embodiment, a data security risk profile associated with a certain location can be ranked as low risk, moderate risk or high risk based on the number of reports of stolen devices or reports of device hackings exceeding predetermined thresholds, etc. Many variations may be apparent to one of ordinary skill in the art implementing embodiments of the present invention. Determinations made by risk calculator 118 (e.g., probabilities of network service disruptions and potential security risks) are used to determine the data to be prefetched in advance of a user request, with the advantage of taking data security risks into account for protecting user information.

Logic controller 114 determines data to be prefetched in advance of an anticipated user request for the data (step 310). Logic controller 114 utilizes predictions and determinations made by location predictor 116 and risk calculator 118 in determining what data to prefetch. Using personal data provided by modeler 108, logical controller 114 can anticipate, i.e., predict, what data the user of mobile computing device 102 will request to access via a connection (e.g., a cellular service network connection) to a communications network, such as the Internet.

As one example, through an analysis of an email correspondences, logic controller 114 determines that the user will need to download a first document for a meeting they will be attending later in the day. If it is predicted that the area where the meeting will be held is subject to wireless network disruptions, such as network dead spots or heavy usage traffic, logic controller 114 determines that the first document should be downloaded ahead of time, i.e., prefetched. Additionally or alternatively, a colleague tells the user of mobile computing device 102 in a stored voicemail to bring a second document to the meeting. Analysis of the voicemail (an example of voice recognition data) causes logic controller 114 to determine that the second document will need to be downloaded ahead of time as well.

Upon analysis of a data risk profile associated with a location that the user of mobile computing device 102 is predicted to travel to, logic controller 114 can determine that certain data should not be prefetched to prevent a possible breach or loss of confidential information. In one example scenario, the user has a meeting at their bank with a financial advisor at 4 pm in the afternoon. The user will need certain banking materials and documentation on hand for the meeting but the user is predicted to encounter network connectivity disruptions at or near an area where the bank is located. If the area of town the bank is located in is determined to be a high risk zone however, (e.g., high risk in terms of the potential for the confidential banking information to be compromised), logic controller 114 determines that certain data and banking materials the user needs will not be prefetched to prevent their exposure to unauthorized access.

Logic controller 114 can determine what data (of the data that is predicted to be requested) is safe for prefetching, given the risk analysis of a predicted location. The determination of which data is or is not appropriate (e.g., safe) to prefetch can be based on default or, optionally, user configured criteria. For example, a user can specify that certain types of data and materials can always be prefetched regardless of a data security risk profile type (e.g., low, moderate, high, etc.), whereas other types of data should never be prefetched in any circumstance. Some examples of data that can be prefetched include, but are not limited to, emails, webpages (e.g., for offline viewing), web documents, web forms, work and business documents, financial (e.g., banking) materials and health materials.

In some embodiments, logic controller 114 can alert the user that certain data (e.g., the confidential banking materials) will not be prefetched for security reasons, giving the user an opportunity to retrieve the documents and data by another means. Further, the user can in some embodiments, set a limit on the amount of data that can be prefetched (e.g., on a given day) due to data usage restrictions and set a prefetch priority level for one or more different types of data eligible for prefetching.

Logic controller 114 prefetches data from one or more of server computers 140A-N in advance of an anticipated user request for the data (step 312). The prefetched data can be stored in data cache 104 for rapid access, or otherwise another form of storage associated with mobile computing device 102. Logic controller 114 prefetches the data in anticipation of limited wireless network service and the data has been determined to be safe for prefetching according the data risk analysis, as previously discussed. The data can be prefetched according to a default or user-configured threshold of time prior to an approximate time that the user is predicted to request the data or encounter service disruptions.

In some embodiments, the system, i.e., data cache selector 106, can learn from user interaction with previously prefetched data to make better decisions regarding future data prefetching performance. For example, if more data is frequently being prefetched than the user is typically requesting to have, data cache selector 106 can make automatic adjustments to reduce the amount of data it prefetches. Additionally or alternatively, if a user is frequently requesting data other than what is being prefetched, the system can learn to start prefetching data that is more closely aligned to what the user typically requests.

In certain embodiments, data cache selector 106 may be implemented on one or more of server computers 140A-N. These embodiments operate generally as described above, but may include certain differences. In these embodiments, the functionality of data cache selector 106 can be distributed amongst a plurality of server computers 140A-N. For example, server computer 140A can be responsible for communicating with mobile computing device 102 and other servers and devices to retrieve personal user data and external data. Server computer 140B can be responsible for making predictions and determining data security risk profiles based on data sent from server computer 140A. Server computer 140C can be responsible for determining the data to prefetch based on communications with server computer 140 B and server computer 140D can prefetch and transmit the determined data to mobile computing device 102. Further, in some embodiments, mobile computing device 102 communicates with server computers 140A-N implementing data cache selector 106 to initiate the process of mobile data prefetching as described herein. Many modifications and variations may be apparent to one of ordinary skill in the art implementing such embodiments of the present invention.

Figure 4:
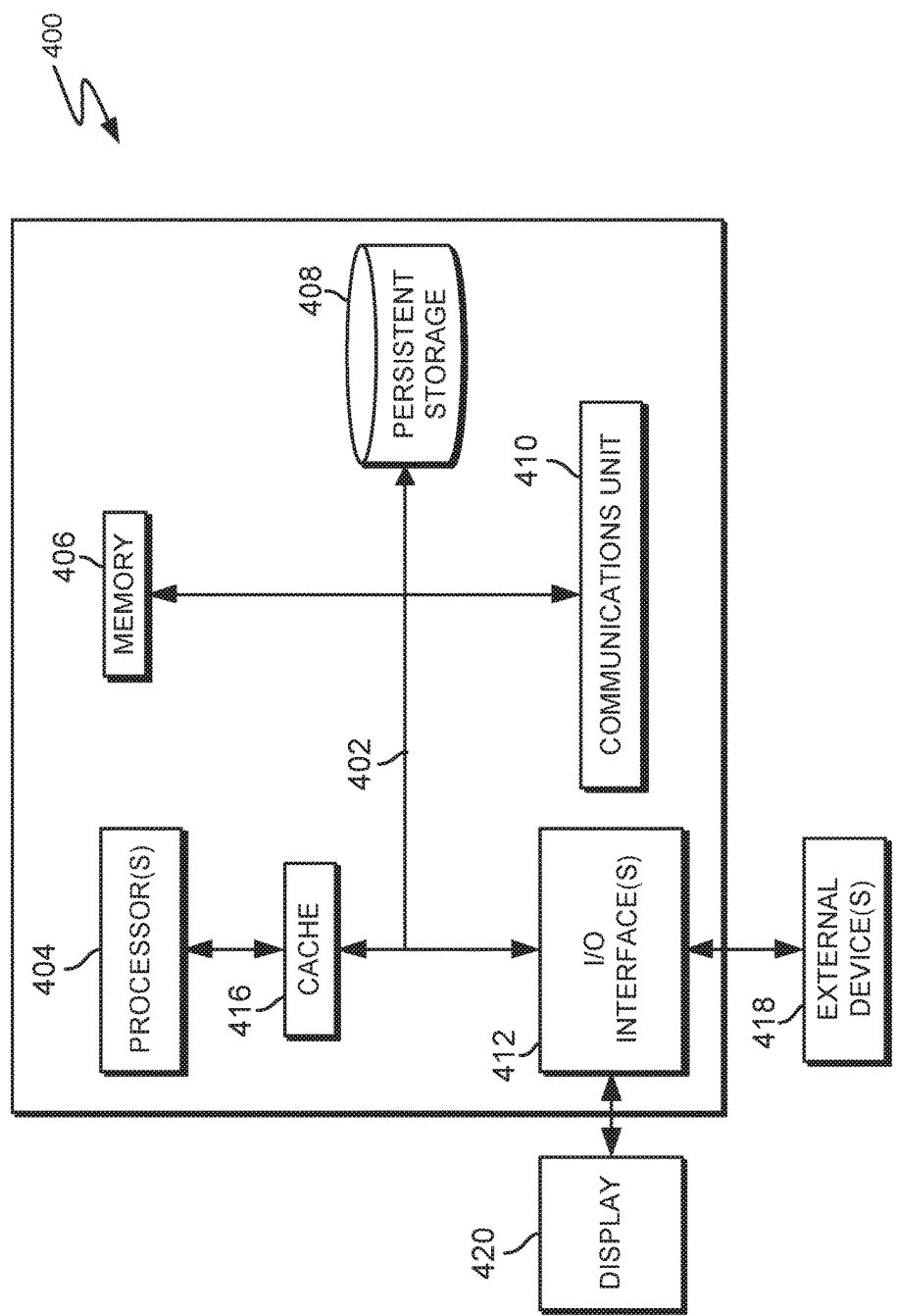
FIG. 4 is a block diagram of components of a mobile computing device executing the data cache selector program, in accordance with an embodiment of the present invention.

FIG. 4 depicts a block diagram 400 of components of mobile computing device 102 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Mobile computing device 102 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Data cache selector 106 can be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 can provide communications through the use of either or both physical and wireless communications links. Data cache selector 106 can be downloaded to persistent storage 408 through communications unit 410.

I/O interface(s) 412 allows for input and output of data with other devices that can be connected to mobile computing device 102. For example, I/O interface 412 can provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., data cache selector 106, can be stored on such portable computer readable storage media and can be loaded onto persistent storage 408 via I/O interface(s) 412. I/O interface(s) 412 also connect to a display 420. Display 420 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for preemptive mobile data caching, the method comprising:
   retrieving, by a data cache selector program, personal user data associated with a user of a mobile computing device;
   retrieving, by the data cache selector program, external data associated with network service availability;
   predicting, by the data cache selector program, a location the user is travelling to based on the personal user data retrieved;
   determining, by the data cache selector program, a data security risk profile associated with the location predicted, based on the personal user data and the external data retrieved, wherein the data security risk profile is determined based on one or more data security risks associated with the location predicted;

alerting, by the data cache selector program, the user that certain data was not prefetched based on the one or more data security risks associated with the location predicted;

determining, by the data cache selector program, data to be prefetched in advance of a user request for the data, wherein the data is determined based on an analysis of the personal user data retrieved, the location predicted and the data security risk profile; and prefetching, by the data cache selector program, the data determined in advance of the user request for the data.

2. The method of claim 1, wherein the personal user data comprises at least one of historical location data, calendar information, scheduled events, reminders, notes, voice recognition data and email correspondences.

3. The method of claim 2, further comprising:

determining, by the data cache selector program, one or more user travel routines based on the personal user data retrieved; and analyzing, by the data cache selector program, the one or more user travel routines to determine a network service disruption that the user routinely encounters.

4. The method of claim 1, wherein the external data comprises data from at least one of one or more other mobile devices, one or more web servers or one or more Internet of Things (IoT) connected objects.

5. The method of claim 1, wherein the network service availability is associated with a cellular service network or a Wi-Fi network.

6. A computer program product for preemptive mobile data caching, the computer program product comprising:

one or more computer readable storage media and program instructions stored on the one or more computer readable storage media, the program instructions comprising:

program instructions to retrieve, by a data cache selector program, personal user data associated with a user of a mobile computing device;

program instructions to retrieve, by the data cache selector program, external data associated with network service availability;

program instructions to predict, by the data cache selector program, a location the user is travelling to based on the personal user data retrieved;

program instructions to determine, by the data cache selector program, a data security risk profile associated with the location predicted, based on the personal user data and the external data retrieved, wherein the data security risk profile is determined based on one or more data security risks associated with the location predicted;

program instructions to alert, by the data cache selector program, the user that certain data was not prefetched based on the one or more data security risks associated with the location predicted;

program instructions to determine, by the data cache selector program, data to be prefetched in advance of a user request for the data, wherein the data is determined based on an analysis of the personal user data retrieved, the location predicted and the data security risk profile; and program instructions to prefetch, by the data cache selector program, the data determined in advance of the user request for the data.

7. The computer program product of claim 6, wherein the personal user data comprises at least one of historical location data, calendar information, scheduled events, reminders, notes, voice recognition data and email correspondences.

8. The computer program product of claim 7, further comprising:

program instructions to determine, by the data cache selector program, one or more user travel routines based on the personal user data retrieved; and program instructions to analyze, by the data cache selector program, the one or more user travel routines to determine a network service disruption that the user routinely encounters.

9. The computer program product of claim 6, wherein the external data comprises data from at least one of one or more other mobile devices, one or more web servers or one or more Internet of Things (IoT) connected objects.

10. The computer program product of claim 6, wherein the network service availability is associated with a cellular service network or a Wi-Fi network.

11. A computer system for preemptive mobile data caching, the computer system comprising:

one or more computer processors;

one or more computer readable storage media;

program instructions stored on the one or more computer readable storage media for execution by at least one of the one or more processors, the program instructions comprising:

program instructions to retrieve, by a data cache selector program, personal user data associated with a user of a mobile computing device;

program instructions to retrieve, by the data cache selector program, external data associated with network service availability;

program instructions to predict, by the data cache selector program, a location the user is travelling to based on the personal user data retrieved;

program instructions to determine, by the data cache selector program, a data security risk profile associated with the location predicted, based on the personal user data and the external data retrieved, wherein the data security risk profile is determined based on one or more data security risks associated with the location predicted;

program instructions to alert, by the data cache selector program, the user that certain data was not prefetched based on the one or more data security risks associated with the location predicted;

program instructions to determine, by the data cache selector program, data to be prefetched in advance of a user request for the data, wherein the data is determined based on an analysis of the personal user data retrieved, the location predicted and the data security risk profile; and program instructions to prefetch, by the data cache selector program, the data determined in advance of the user request for the data.

12. The computer system of claim 11, wherein the personal user data comprises at least one of historical location data, calendar information, scheduled events, reminders, notes, voice recognition data and email correspondences.

13. The computer system of claim 12, further comprising:

program instructions to determine, by the data cache selector program, one or more user travel routines based on the personal user data retrieved; and program instructions to analyze, by the data cache selector program, the one or more user travel routines to determine a network service disruption that the user routinely encounters.

14. The computer system of claim 11, wherein the external data comprises data from at least one of one or more other mobile devices, one or more web servers or one or more Internet of Things (IoT) connected objects.

* * * * *